US 12,192,985 B2

(12) United States Patent
Dash et al.

(10) Patent No.: US 12,192,985 B2
(45) Date of Patent: *Jan. 7, 2025

(54) COEXISTENCE MANAGEMENT IN WIRELESS COMMUNICATIONS

(71) Applicant: MAXLINEAR, INC, Carlsbad, CA (US)

(72) Inventors: Debashis Dash, Newark, CA (US); Bahador Amiri, Saratoga, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 17/675,932

(22) Filed: Feb. 18, 2022

(65) Prior Publication Data

US 2022/0191887 A1 Jun. 16, 2022

Related U.S. Application Data

(63) Continuation of application No. 16/827,383, filed on Mar. 23, 2020, now Pat. No. 11,265,888.

(Continued)

(51) Int. Cl.
*H04W 72/12* (2023.01)
*H04W 72/542* (2023.01)
(Continued)

(52) U.S. Cl.
CPC ..... *H04W 72/1215* (2013.01); *H04W 72/542* (2023.01); *H04W 72/54* (2023.01); *H04W 88/06* (2013.01)

(58) Field of Classification Search
CPC ........... H04W 72/1215; H04W 72/542; H04W 72/54; H04W 88/06; H04W 72/541; H04W 72/23; H04W 16/14; Y02D 30/70
See application file for complete search history.

(56) References Cited

U.S. PATENT DOCUMENTS 9,295,096 B1 * 3/2016 Shukla ................ H04W 72/541
2009/0063740 A1 3/2009 Yeh et al.
(Continued)

FOREIGN PATENT DOCUMENTS

EP 1389855 A2 * 2/2004 ............ H04W 88/06

OTHER PUBLICATIONS

Verma "Status of NR-U—Wi-Fi coexistence" doc.:IEEE 802.11-19/1332r0 https://mentor.ieee.org/802.11/dcn/19/11-19-1332-00-coex-status-of-nr-u-wi-fi-coexistence.pptx Jul. 18, 2019.

(Continued)

*Primary Examiner* — Vinncelas Louis
(74) *Attorney, Agent, or Firm* — Buchalter; Jason W. Croft

(57) ABSTRACT

A method includes determining traffic priority information of a first wireless network that includes a first radio configured to communicate according to a first communication protocol on multiple overlapping channels. The method includes determining an operating mode of a second radio as a power save operating mode based on the traffic priority information of the first wireless network. The second radio is included in a second wireless network and is configured to communicate according to a second communication protocol on the overlapping channels. The power save operating mode is configured to avoid interference on the overlapping channels with traffic in the first wireless network. The method includes operating the second radio in the determined power save operating mode.

11 Claims, 8 Drawing Sheets

Related U.S. Application Data

(60) Provisional application No. 62/827,735, filed on Apr. 1, 2019.

(51) Int. Cl.
   *H04W 72/54* (2023.01)
   *H04W 88/06* (2009.01)

(56) References Cited

U.S. PATENT DOCUMENTS

| | | | |
|---|---|---|---|
| 2011/0116490 A1* | 5/2011 | Wilhelmsson | H04W 16/14 370/343 |
| 2011/0222470 A1 | 9/2011 | Satapathy et al. | |
| 2014/0192788 A1* | 7/2014 | Park | H04W 72/23 370/336 |
| 2016/0044516 A1 | 2/2016 | Hedayat et al. | |
| 2017/0034792 A1 | 2/2017 | Shao et al. | |
| 2017/0086076 A1 | 3/2017 | Sadek et al. | |
| 2018/0184231 A1 | 6/2018 | Egner et al. | |
| 2019/0199578 A1 | 6/2019 | Lakshminarayan et al. | |
| 2020/0059938 A1 | 2/2020 | Mukherjee | |
| 2020/0267561 A1 | 8/2020 | Lakshminarayan et al. | |
| 2021/0022004 A1 | 1/2021 | Nilsson et al. | |

OTHER PUBLICATIONS

Jul. 2019 IEEE 802.11 Coexistence Workshop.
White Paper "BCM4325 Bluetooth® and WLAN Coexistence" Broadcom Corporation, Aug. 2008.
Dash, et al.—WhitePaper "Co-existence of WLAN, Bluetooth, ZigBee and Thread in the 2.4 GHz band" Quantenna Communications, Apr. 5, 2019.
"802.15.1-2005—IEEE Standard for Information technology—Local and metropolitan area networks—Specific requirements—Part 15.1a: Wireless Medium Access Control (MAC) and Physical Layer (PHY) specifications for Wireless Personal Area Networks (WPAN)".
"802.15.4-2011—IEEE Standard for Local and metropolitan area networks—Part 15.4: Low-Rate Wireless Personal Area Networks (LR-WPANs).".
"802.15.2-2003—IEEE Recommended Practice for Information technology—Local and metropolitan area networks—Specific requirements—Part 15.2: Co-existence of Wireless Personal Area Networks with Other Wireless Devices Operating in Unlicensed Frequenc".
J. Lansford, et al, "Wi-Fi and Bluetooth: Enabling Co-existence," IEEE Network, vol. 15, No. 5, pp. 20-27, 2001.
N. Golmie, et al., "Bluetooth and WLAN co-existence: Challenges and solutions," Wireless Communications, vol. 10, No. 6, pp. 22-29, 2003.
Bayhan, et al. "Null-While-Talk: Interference Nulling for Improved Inter-Technology Coexistence in LTE-U and WiFi Networks" Pervasive and Mobile Computing, vol. 56, May 2019, pp. 71-87 https://doi.org/10.1016/j.omcj.2019.04.002.

* cited by examiner

COEXISTENCE MANAGEMENT IN WIRELESS COMMUNICATIONS

CROSS-REFERENCE TO RELATED APPLICATION

This patent application claims the benefit of and priority to U.S. application Ser. No. 16/827,383 filed Mar. 23, 2020 and granted Mar. 1, 2022 as U.S. Pat. No. 11,265,888, which in turn claims the benefit of and priority to U.S. Provisional App. No. 62/827,735 filed Apr. 1, 2019. The Ser. No. 16/827,383 application and the 62/827,735 application is each incorporated in the present disclosure by reference in its entirety.

FIELD

The implementations discussed in the present disclosure are related to coexistence management in wireless communications.

BACKGROUND

Unless otherwise indicated in the present disclosure, the materials described in the present disclosure are not prior art to the claims in the present application and are not admitted to be prior art by inclusion in this section.

Wireless networks may communicate using shared channels (e.g., overlapping frequencies) but different protocols. For example, a first wireless network may communicate using a Wi-Fi protocol, a second wireless network may communicate using a Bluetooth protocol; a ZigBee protocol; or a Thread protocol, and a third wireless network may communicate using a cellular protocol.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

One or more implementations of the present disclosure may include a method that includes determining traffic priority information of a first wireless network that includes a first radio configured to communicate according to a first communication protocol on multiple overlapping channels. The method includes determining an operating mode of a second radio as a power save operating mode based on the traffic priority information of the first wireless network. The second radio is included in a second wireless network and is configured to communicate according to a second communication protocol on the overlapping channels. The power save operating mode is configured to avoid interference on the overlapping channels with traffic in the first wireless network. The method includes operating the second radio in the determined power save operating mode.

One or more implementations of the present disclosure may include a wireless communication device with a first radio, a second radio, and a coexistence management circuit. The first radio is configured to communicate in a first wireless network according to a first communication protocol on multiple overlapping channels. The second radio is co-located with the first radio and is configured to communicate in a second wireless network according to a second communication protocol on the overlapping channels. The coexistence management circuit is coupled to the first radio and the second radio. The coexistence management circuit is configured to determine traffic priority information of the first wireless network. The coexistence management circuit is configured to determine an operating mode of the second radio as a power save operating mode based on the traffic priority information of the first wireless network. The power save operating mode is configured to avoid interference on the overlapping channels with traffic in the first wireless network. The coexistence management circuit is configured to operate the second radio in the determined power save operating mode.

BRIEF DESCRIPTION OF THE DRAWINGS

Example implementations will be described and explained with additional specificity and detail through the use of the accompanying drawings in which.

DETAILED DESCRIPTION OF SOME EXAMPLE IMPLEMENTATIONS

Figure 1:
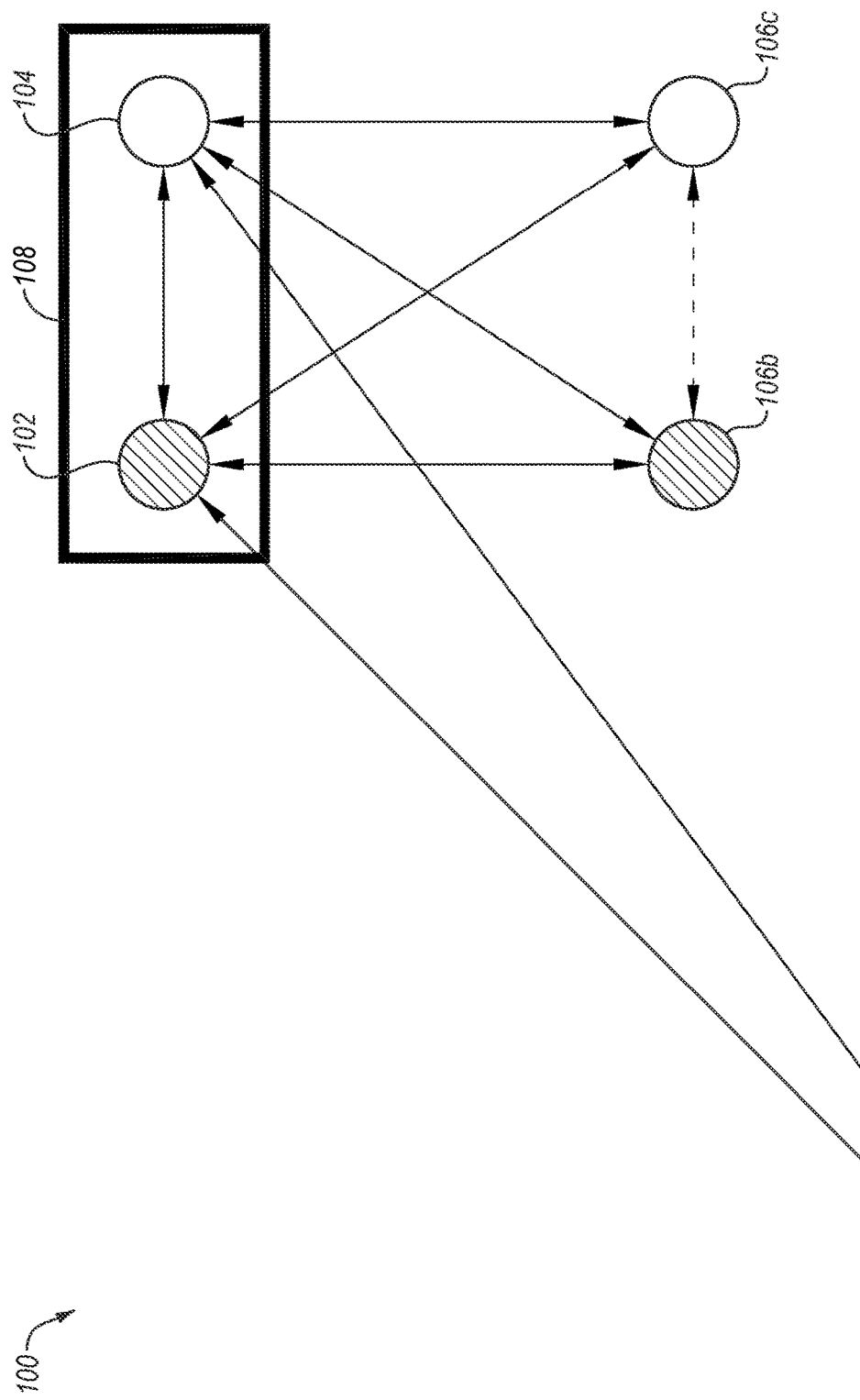
FIG. 1 illustrates an example environment in which a wireless communication device may be implemented.

Multiple radios for wireless networks may be co-located within a single wireless communication device. Each radio may form part of a different wireless network. The wireless networks may communicate using shared channels (e.g., a set of one or more overlapping channels) but according to different communication protocols (e.g., protocols). Example wireless networks include WLANs, WPANs, cellular networks, Bluetooth networks, ZigBee networks, and Thread networks. In some implementations, the shared channels may be within a 2.4 gigahertz (GHz) industrial, scientific, and medical (ISM) band.

Due to the co-location of the radios and the shared channels, signals that are transmitted on the shared channels may reach wireless stations (STAs) and/or the radios of different wireless networks. The signals may cause the STAs and/or the radios in the different wireless networks to experience signal interference. For example, a STA of a first wireless network may experience signal interference when a signal from a radio of a second wireless network reaches the STA of the first wireless network. As another example, a radio of the first wireless network may experience signal interference when a signal from the radio of the second wireless network reaches the radio of the first wireless network. The signal interference experienced by the radios and/or the STAs may reduce a throughput of the different wireless networks and/or cause packet loss.

In some wireless network technologies, signal interference may be caused by packets being formatted (e.g., packet arrangement and sequencing) according to different protocols. For example, packets that are formatted according to the Wi-Fi protocol may be arranged and sequenced differently than packets that are formatted according to the cellular protocol. The difference in packet formats may prevent the radios from being able to decipher packets that are formatted according to different protocols. The difference in packet formatting may also prevent the radios from being able to determine operations to perform to reduce signal interference.

In some wireless network technologies, safeguard channel access protocols may be implemented to try and partially prevent signal interference. Example safeguard channel access protocols may include carrier sense, adaptive frequency hopping, and frequency skipping. In addition, in some wireless network technologies, the safeguard channel access protocols may include collaborative and non-collaborative channel access solutions. Example collaborative channel access solutions may include alternative channel access, packet traffic arbitration, and deterministic interference suppression. Example non-collaborative channel access solutions may include adaptive interference suppression, adaptive packet selection and scheduling, and adaptive frequency hopping.

The alternative channel access solution may occur at a media access control (MAC) layer of the radios and/or the STAs. In addition, communication according to the alternative channel access solution may include a beacon interval that is divided into two parts. Further, communication according to the alternative channel access solution may implement time division multiple access (TDMA) for access to the shared channels. The packet traffic arbitration solution may also occur at the MAC layer of the radios. For the packet traffic arbitration solution, a PTA circuit may authorize all transmissions on the shared channels by the radios. The deterministic interference suppression solution may occur at a physical (PHY) layer of the STAs. The deterministic interference suppression solution may include adding a notch filter to the STAs (e.g., WLAN STAs) configured to filter out a narrow band (e.g., signals sent using the Bluetooth protocol). Another collaborative channel access solution may include frequency skipping. For the frequency skipping solution, the radios may avoid transmitting on channels that overlap common channels of a different wireless network. For example, a WLAN radio may commonly operate on WLAN channel 1 and a Bluetooth radio may avoid Bluetooth channels 0-21 and a ZigBee radio may avoid ZigBee channels 11-14 since these channels overlap WLAN channel 1.

The adaptive interference suppression solution may occur at the PHY layer of the STAs. For the adaptive interference suppression solution, adaptive filtering may occur at the STAs (e.g., WLAN STAs) to filter out the narrow band (e.g., signals sent using the Bluetooth protocol). The adaptive packet selection and scheduling solution may occur at the MAC layer of the radios and/or the STAs. According to the adaptive packet selection and scheduling solution, packet properties (e.g., payload length, forward error correction (FEC) codes, and automatic repeat request (ARQ) codes) may be adaptively selected and traffic may be scheduled to occur in low interference channels. The adaptive frequency hopping solution may cause interference of channels (e.g., WPAN channels) to be estimated and signals to be sent by hopping (e.g., changing) the channels of the signals based on the estimation.

The collaborative channel access solutions may perform better for orthogonalizing access to the shared channels compared to the non-collaborative channel access solutions. However, the collaborative channel access solutions may require tight integration between the different wireless networks. The tight integration may include frequent handshakes between hardware or software of the radios and/or the STAs of the different wireless networks.

Some implementations described in the present disclosure may orthogonalize access to the shared channels without tight integration between the different wireless networks. According to at least one implementation described in the present disclosure, the wireless communication device may include a coexistence management circuit (CMC). The CMC may be configured to control channel access for a first radio and a second radio. The first radio and the second radio may communicate according to different protocols. The CMC may detect a first set of parameters of communication between the first radio and a first STA of a first wireless network on the shared channels (e.g., overlapping channels). The CMC may also detect a second set of parameters of communication between the second radio and a second STA of a second wireless network on the shared channels. In addition the CMC may compare the first set of parameters with the second set of parameters. Further, the CMC may direct how the first radio communicates and how the second radio communicates based on the comparison of the first set of parameters with the second set of parameters.

Accordingly, in some implementations, the CMC may provide channel access solutions for communication between radios and STAs on channels within and outside of the 2.4 GHz ISM band. For example, the CMC may provide a channel access solution for communication on channels within the 2.4 GHz ISM band and a 6 GHz band. In addition, the CMC may provide a single channel access solution for communication using Wi-Fi radios (e.g., WLAN radios), Bluetooth radios, ZigBee radios, Thread radios, and cellular radios. In addition, the CMC may provide a channel access solution that does not cause the radios to decipher packets formatted according to different protocols. For example, the CMC may determine the channel access techniques and packet formatting for the different wireless networks and direct how the other radios communicate based on the channel access techniques and packet formatting. In addition, the CMC may provide a channel access solution that can be based on estimated and/or actual traffic within the wireless networks. In addition, in some implementations, the CMC may provide a channel access solution that is based on priority of traffic to reduce battery consumption of associated devices due to delays.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example environment 100 in which a wireless communication device 108 may be implemented. The environment 100 may include a first STA 106*a*, a second STA 106*b*, and a third STA 106*c* (referenced collectively in the present disclosure as "STAs 106"). Example STAs 106 may include personal computers, printers, televisions, digital video disc (DVD) players, security cameras, smartphones, tablets, smart devices, or any other appropriate computing device configured for wireless communication. Examples of the wireless communication device 108 may include mesh nodes, access points, repeaters, laptops, artificial reality devices, virtual reality devices, smart speakers, drones, personal computers, or any other appropriate computing device configured for wireless communication using multiple radios.

In some implementations, the wireless communication device 108 may include a first radio 102 and a second radio 104. The first radio 102 and the second radio 104 may both be positioned within the wireless communication device 108. For example, in some implementations, the first radio 102 and the second radio 104 may be positioned on a single circuit board of the wireless communication device 108. As another example, in some implementations, the first radio 102 and the second radio 104 may be positioned within a single housing of the wireless communication device 108.

The first radio 102, the first STA 106a, and the second STA 106b may form a first wireless network. The second radio 104 and the third STA 106 may form a second wireless network. The first wireless network may be configured to communicate according to a first protocol on a first set of channels. The second wireless network may be configured to communicate according to a second protocol on a second set of channels. The first set of channels and the second set of channels may include the shared channels (e.g., the set of one or more overlapping channels that may include the same frequencies). The first radio 102 may be configured to permit simultaneous communication between the first radio 102 and the first STA 106a and between the first radio 102 and the second STA 106b. In addition, the wireless communication device 108 may be configured to control channel access to the shared channels and non-shared channels for the first radio 102 and the second radio 104.

The first STA 106a, as illustrated in FIG. 1, may represent a far case STA that is positioned far enough away from the wireless communication device 108 that the first STA 106a cannot detect signals transmitted by the second radio 104. In addition, as illustrated in FIG. 1, the second STA 106b and the third STA 106c may represent close case STAs that are positioned close enough to the wireless communication device 108 that they can detect signals that are transmitted by both the first radio 102 and the second radio 104.

Since the first STA 106a cannot detect signals transmitted by the second radio 104, simultaneous communication on the shared channels may occur. To reduce the impact of signal interference, the first radio 102, the second radio 104, and the STAs 106 may perform the collaborative channel access solutions or the non-collaborative channel access solutions discussed above. For example, communication may be restricted on the shared channels while the second radio 104 is involved in ongoing communication on the shared channels. As another example, the wireless communication device 108 may instruct the first STA 106a and/or the second STA 106b via the first radio 102 to communicate on channels that do not overlap channels that the second wireless network uses.

In general, in the environment 100, the wireless communication device 108 may determine information from or about the first or second network based on signals received by the first radio 102 or the second radio 104. For example, the wireless communication device 108 may determine, from signals received by the first radio 102 or the second radio 104, channel quality or interference information in the first or second network, an unused remainder of a reserved transmit opportunity (TXOP), a beginning time of a next empty transmission slot, absence of motion detection, or other information. Further, the wireless communication device 108 may then operate the other of the second radio 104 or the first radio 102 based on the information determined from the signals received by the first radio 102 or the second radio 104.

For example, if the wireless communication device 108 determines channel quality and interference information from the first radio 102, the second radio 104 may adjust its operating parameters based on the channel quality and interference information from the first radio 102.

As another example, if the first radio 102 reserves a TXOP but does not use all of the TXOP, the second radio 102 may send one or more packets during the remainder of the TXOP and without performing channel access.

As another example, if the wireless communication device 108 determines a beginning or start time of a next empty transmission slot in the first network, the second radio 104 may send one or more packets in the second network at the beginning or start time of the next empty transmission slot and without performing channel access.

As another example, the wireless communication device 108 may determine, after motion detection by the first radio 102, that the second radio 104 does not detect motion, the second radio 104 having a shorter range than the first radio 102; in response, the first radio 102 may be used to instruct a remote wireless communication device 108 through first radios 102 of both wireless communication devices 108 to turn on a second radio 104 of the remote wireless communication device 108 to detect motion.

As another example, the wireless communication device 108 may determine from a signal received through the first radio 102 that it should turn on the second radio 104, the second radio 104 having a shorter range than the first radio 102, to detect motion.

As another example, the wireless communication device 108 may determine from the second radio 104 that there is ongoing transmission in the second wireless network between the second radio 102 and the third STA 106. If the wireless communication device 108 wants to transmit data to the first or second STAs 106a, 106b during the ongoing transmission, it may transmit the data to the first or second STAs 106a, 106b and null the signal to the third STA 106c.

As another example, the wireless communication device 108 may determine traffic priority information from the first radio 102 that indicates first traffic to be sent in the first wireless network to or from the first radio 102 has a first priority that is relatively high. The second radio 104 may then operate in a power save operating mode to avoid interference with the first traffic in the first wireless network.

FIG. 1 illustrates the environment 100 with three STAs 106. In another implementation the environment 100 may include any number of STAs divided between the different wireless networks in any arrangement. Further, the wireless communication device 108 is illustrated in FIG. 1 as including two radios 102, 104. In another implementation, the wireless communication device 108 may include three or more radios.

Figure 2:
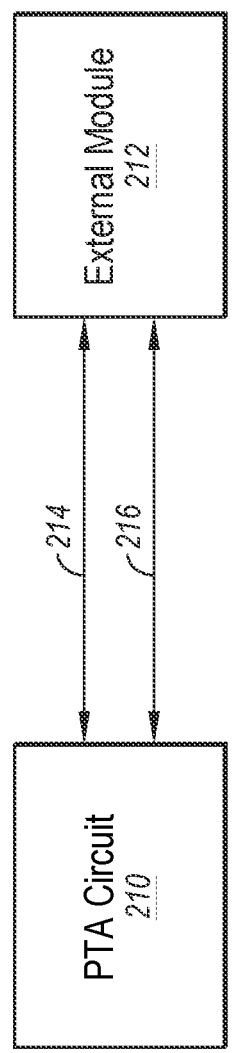
FIG. 2 illustrates an example packet traffic arbiter (PTA) circuit and an external module that may be implemented in the wireless communication device of FIG. 1.

FIG. 2 illustrates an example PTA circuit 210 and an external module 212 that may be implemented in the wireless communication device 108 of FIG. 1. The PTA circuit 210 may be coupled to the external module 212 via a first wire 214 and a second wire 216. The external module 212 may correspond to the first radio 102 or the second radio 104 of FIG. 1. The PTA circuit 210 may be configured to control channel access to the shared channels and/or the non-shared channels for the external module 212 and another radio (e.g., a WLAN radio) (not illustrated in FIG. 2). In some implementations, the PTA circuit 210 may form part of the other radio.

In some implementations, the PTA circuit 210 may reduce the occurrence of scenarios that cause interference due to signals transmitted by the external module 212 and/or the other radio. In these and other implementations, the PTA circuit 210 and the external module 212 may perform a handshake using the first wire 214 and the second wire 216 prior to the external module 212 transmitting on the shared channels. For example, the external module 212 may provide a request signal to the PTA circuit 210 via the first wire 214 and the PTA circuit 210 may provide a grant signal to the external module 212 via the second wire 216. In some implementations, the request signal may indicate that the external module 212 has a signal to transmit on a particular shared channel. In these and other implementations, the request signal may indicate that the external module 212 has received a signal and has a signal to transmit on the particular shared channel in response to the received signal. The grant signal may indicate that another wireless network (e.g., a WLAN formed in part by the other radio) is not already transmitting signals on the particular shared channel.

In some implementations, if the request signal is received while the other wireless network is already transmitting signals on the particular shared channel, the PTA circuit 210 may not provide the grant signal. In these and other implementations, if the request signal is received while the other wireless network is not transmitting signals on the particular shared channel, the PTA circuit 210 may provide the grant signal. Alternatively, if the external module 212 receives a signal from a STA on the particular shared channel, the external module 212 may provide the request signal and wait for the grant signal before transmitting a response to the packet on the particular shared channel.

In some implementations, if the other radio has a signal to transmit on the particular shared channel, the other radio may detect if the grant signal is currently being provided by the PTA circuit 210. If the grant signal is currently being provided by the PTA circuit 210, the other radio may wait until the grant signal is no longer being provided to transmit the signal on the particular shared channel. If the grant signal is not currently being provided by the PTA circuit 210, the other radio may transmit the signal on the particular shared channel.

In some implementations, the second wire 216 may be omitted and just a single wire (e.g., the first wire 214) may be used to control channel access for the external module 212 and the other radio. In these and other implementations, the PTA circuit 210 may provide the grant signal any time the other wireless network is transmitting a signal on the particular shared channel (e.g., the grant signal may indicate that the other radio is busy). The external module 212 may determine if the grant signal is being received. If the grant signal is being received, the external module 212 may wait to transmit the signal on the particular shared channel. If the grant signal is not being received, the external module 212 may transmit the signal on the particular shared channel.

The sequence of transmit and receive events by the external module 212 and the other radio may cause contention scenarios or non-contention scenarios. If a duty cycle of the external module 212 and the other radio are low (e.g., the traffic of the external module 212 and the other radio are low), most scenarios will be non-contention scenarios. A portion of the contention scenarios may be avoided by the PTA circuit 210 controlling channel access as described in Table I. In addition, a portion of the contention scenarios may cause delays in transmission by the PTA circuit 210 controlling channel access as described in Table I.

Table I describes a sequence of actions by the external module 212 and the other radio and whether interference or packet loss may occur using the PTA circuit 210.

TABLE I

| Scenario | First Event | Second Event | Action | Result |
| --- | --- | --- | --- | --- |
| 1 | EXT TX | WLAN TX | WLAN waits until the request signal is no longer provided. | Delay in WLAN TX |
| 2 | EXT TX | WLAN RX | WLAN continues to RX. EXT TX may stop depending on priority. | Interference/Packet Loss |
| 3 | EXT RX | WLAN TX | WLAN waits until the request signal is no longer provided. | Delay in WLAN TX |
| 4 | EXT RX | WLAN RX | WLAN continues to RX, EXT provides the request signal and the EXT and WLAN continue to RX. | Interference/Packet Loss |
| 5 | WLAN TX | EXT TX | EXT provides the request signal and waits for the grant signal, the PTA circuit 210 waits for the WLAN to finish TX to provide the grant signal, EXT either delays the TX or provides the request signal again. | Delay in EXT TX |
| 6 | WLAN TX | EXT RX | WLAN does not stop TX, EXT provides the request signal and continues to RX. | Interference/Packet Loss |
| 7 | WLAN RX | EXT TX | EXT provides the request signal and waits for the grant signal. The PTA circuit 210 waits for the WLAN to finish RX to provide the grant signal, EXT either delays the TX or provides the request signal again. | Delay in EXT TX |

TABLE I-continued

| Scenario | First Event | Second Event | Action | Result |
|---|---|---|---|---|
| 8 | WLAN RX | EXT RX | WLAN does not stop RX, EXT provides the request signal and continues to RX. | Interference/Packet Loss |

In Table I, TX may indicate that the corresponding radio is transmitting or has a signal to transmit. Also, in Table I, RX may indicate that the corresponding radio is receiving a signal. In addition, in Table I, the first event column may describe an act that occurred before the act described in the second event column. Further, in Table I, the action column may describe an action taken by the radios and, in some scenarios, the PTA circuit 210. In Table I, the result column may describe whether interference and packet loss likely occurred. Also, in Table I, WLAN may represent the other radio that includes or is coupled to the PTA circuit 210 and EXT may represent the external module 212 and/or the radio included in or coupled to the eternal module 212. In this example, it is assumed for illustrative purposes that the radio that includes or is coupled to the PTA circuit 210 implements the WLAN protocol; more generally, the radio may implement a different protocol than the radio included in or coupled to the external module 212.

The PTA circuit 210 may reduce a number of the scenarios that results in interference and/or packet loss. Some of the scenarios (e.g., scenarios 1, 3, 5, and 7) indicate a delay occurred, but a delay is a preferred result versus interference and/or packet loss. In some implementations, the PTA circuit 210 may not provide channel access solutions for the scenarios when the radio corresponding to the second event receives a frame (e.g., scenarios 2, 4, 6, and 8) while the radio corresponding to the first event is already involved in communication. FIG. 2 illustrates the environment 200 with a single external module 212. In another implementation, the environment 200 may include two or more external modules 212.

Figure 3:
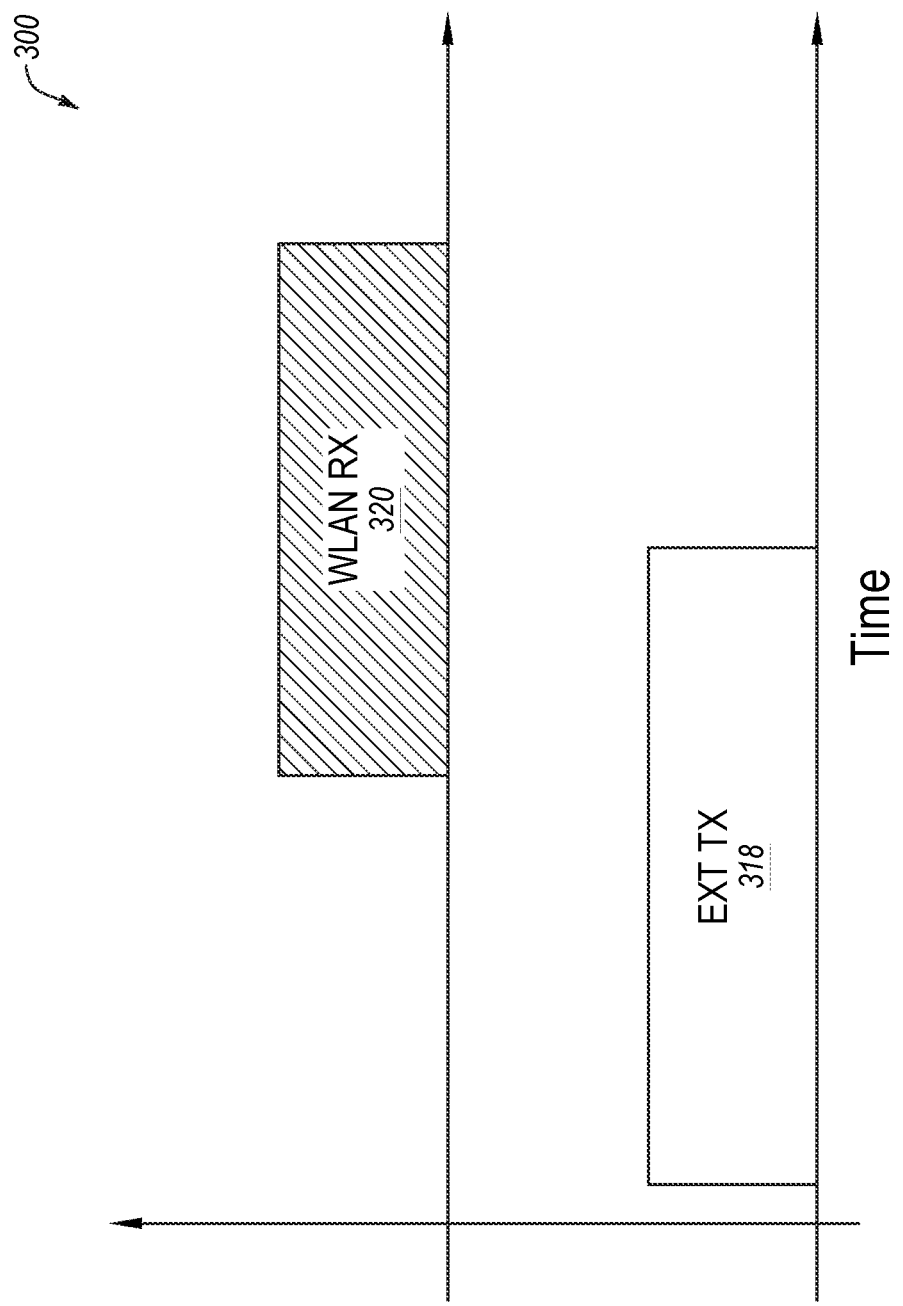
FIG. 3 illustrates a graphical representation of example timing of communication events.

FIG. 3 illustrates a graphical representation 300 of example timing of communication events. Specifically, FIG. 3 illustrates a WLAN RX event 320 (e.g., a WLAN radio receive event) that starts during an ongoing EXT TX event 318 (e.g., an external module transmit event). The scenario illustrated in FIG. 3 may occur if, for instance, the STA that transmits the signal for the WLAN RX event 320 is a far case STA as discussed above. The graphical representation 300 may correspond to scenario 2 of Table I.

Figure 4:
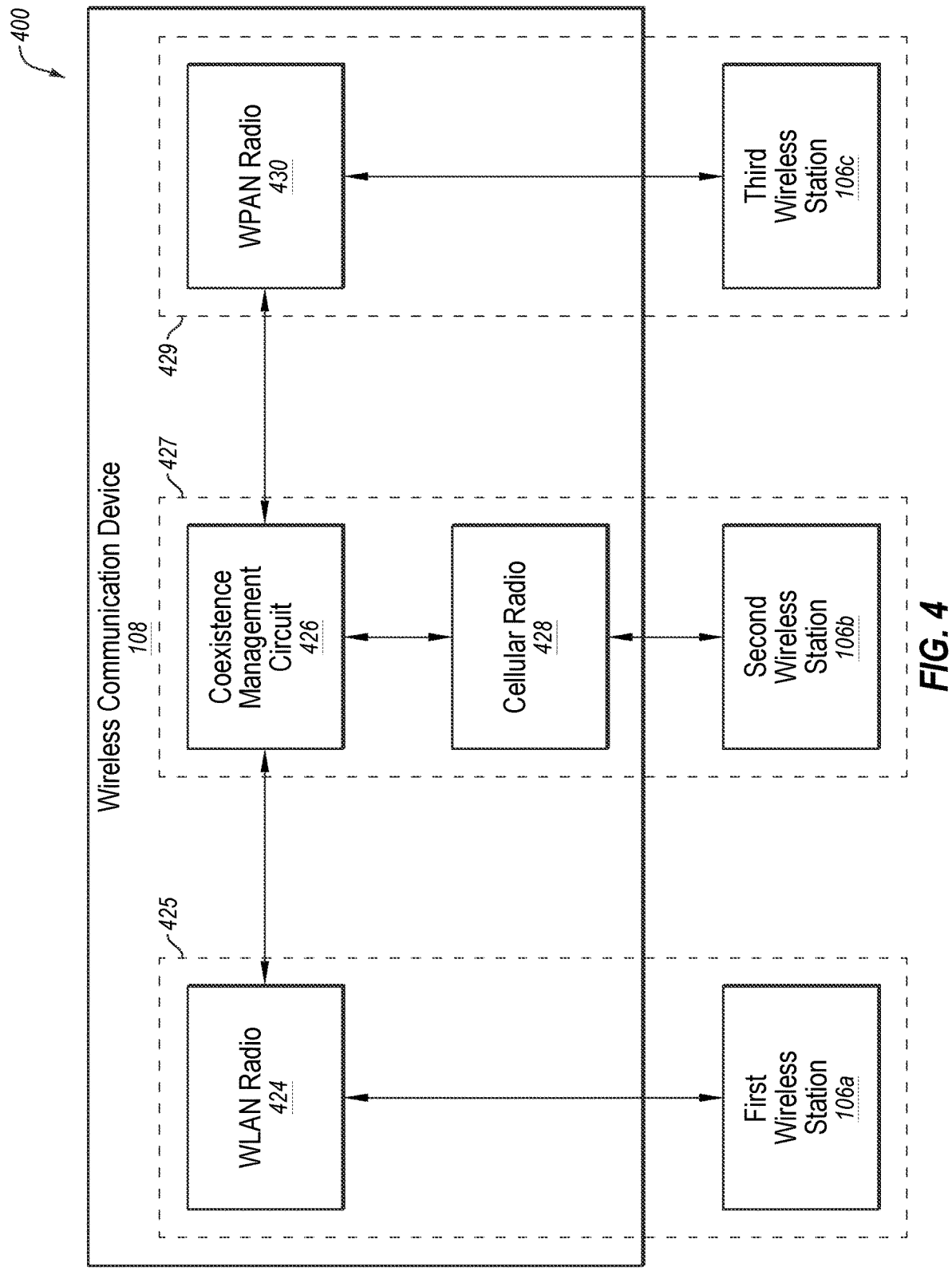
FIG. 4 illustrates another example environment in which the wireless communication device of FIG. 1 may be implemented.

FIG. 4 illustrates another example environment 400 in which the wireless communication device 108 of FIG. 1 may be implemented. The wireless communication device 108 may include a WLAN radio 424, a CMC 426, a cellular radio 428, and a WPAN radio 430. The WLAN radio 424, the cellular radio 428, and/or the WPAN radio 430 may correspond to the first radio 102 and/or the second radio 104 of FIG. 1.

In some implementations, the WLAN radio 424 and the first STA 106a may form a WLAN 425 (e.g., a first wireless network). In these and other implementations, the WPAN radio 430 and the third STA 106c may form a WPAN 429 (e.g., a third wireless network). The WPAN 429 may include a Bluetooth network, a ZigBee network, or a Thread network. Additionally, the cellular radio 428 and the second STA 106b may form a cellular network 427 (e.g., a third wireless network). Each of the WLAN 425, the cellular network 427, and the WPAN 429 may transmit signals on the shared channels.

The WLAN radio 424 may implement the IEEE 802.11 standard which is a contention-based standard for handling communications among multiple competing devices for a shared wireless communication medium on a selected one of multiple communication channels. The frequency range of each communication channel is specified in the corresponding one of the IEEE 802.11 protocols being implemented, e.g. "a", "b", "g", "n", "ac", "ad", "ax". The cellular radio 428 may implement the cellular protocol. Further, the WPAN radio 430 may implement the WPAN protocol, the Bluetooth protocol, the Thread protocol, or the Zigbee protocol. In some implementations, the WLAN 425, the cellular network 427, and the WPAN 429 may be any wireless network that is implemented using twenty-eight-millimeter wavelength signals.

The CMC 426 may be coupled to the WLAN radio 424, the cellular radio 428, and the WPAN radio 430. In some implementations, the CMC 426 may directly control channel access for the WLAN radio 424, the cellular radio 428, and the WPAN radio 430. In these and other implementations, the CMC 426 may indirectly control channel access for the STAs 106. In some implementations, the CMC 426 may direct how the WLAN 425, the cellular network 427, and the WPAN 429 communicate on the shared channels and the non-shared channels.

In some implementations, the CMC 426 may detect a first set of parameters of communication within the WLAN 425. In these and other implementations, the CMC 426 may detect a second set of parameters of communication within the WPAN 429. In addition, the CMC 426 may detect a third set of parameters of communication within the cellular network 427. In these and other implementations, the CMC 426 may detect the first set of parameters, the second set of parameters, and/or the third set of parameters only on the shared channels. In some implementations, the CMC 426 may detect the first set of parameters, the second set of parameters, and/or the third set of parameters on both the shared channels and the non-shared channels. The CMC 426 may compare the first set of parameters, the second set of parameters, and the third set of parameters with each other. Further, the CMC 426 may at least partially control channel access for the WLAN 425, the cellular network 427, and the WPAN 429 based on the comparison of the first set of parameters, the second set of parameters, and the third set of parameters.

Examples of channel access control being performed using information extracted from preambles of packets that are transmitted within the WLAN 425, the cellular network 427, and/or the WPAN 429 will now be discussed. In some implementations, the CMC 426 may receive and identify the preamble of the packet transmitted within the WLAN 425. In addition, the CMC 426 may extract and/or derive information from the preamble describing the communication within the WLAN 425. The information extracted and/or derived from the preamble may include bandwidth occupied by the packet, length of the packet, modulation and coding scheme (MCS) of the packet, a current operation mode of the WLAN radio 424 and/or the first STA 106a, a channel condition of the channel the packet was transmitted on, and/or an expected traffic rate of communication within the WLAN 425. In some implementations, the first set of parameters may include the information extracted and/or derived from the preamble of the packet transmitted within the WLAN 425.

In some implementations, the CMC 426 may perform the same or similar processes to extract and/or derive information from preambles of packets transmitted within the cellular network 427 and/or the WPAN 429. In these and other implementations, the second set of parameters may include the information extracted and/or derived from the preamble of the packet transmitted within the WPAN 429. Additionally or alternatively, the third set of parameters may include the information extracted and/or derived from the preamble of the packet transmitted within the cellular network 427.

In some implementations, the CMC 426 may control channel access based on an operation mode priority. In these and other implementations, the CMC 426 may determine the operation mode of the WLAN 425, the cellular network 427, and/or the WPAN 429 based on the information extracted and/or derived from the preambles. In some implementations, the CMC 426 may control channel access to prioritize a particular operation mode (e.g., a particular protocol) over other operation modes. For example, the operation mode priority may indicate that a Wi-Fi operation mode has a higher priority than a cellular or a Bluetooth operation mode. For example, if the preamble indicates that the WLAN 425 has the Wi-Fi operation mode and that the WPAN 429 has the Bluetooth operation mode, the CMC 426 may instruct the WPAN radio 430 to transmit on a non-shared channel to open more shared channels for communication within the WLAN 425. Alternatively, the CMC may instruct the WPAN radio 430 to delay a transmission until a communication within the WLAN 425 ends. As another example, the operation mode priority may indicate that communications that involve battery-powered devices has a higher priority than communications that involve non-battery-powered devices. In some implementations, the operation mode priority may be determined and selected by a developer of the wireless communication device 108. In other implementations, the operation mode priority may be determined and selected by a user of the wireless communication device 108. Additionally or alternatively, the operation mode priority may be fixed (e.g., statically set) or adaptive (e.g., dynamically set).

In some implementations, the CMC 426 may control channel access based on a packet type priority. In these and other implementations, the CMC 426 may determine a packet type of the packets transmitted within the WLAN 425, the cellular network 427, and/or the WPAN 429 based on the information extracted and/or derived from the preambles. The CMC 426 may control channel access to prioritize a particular packet type. For example, the packet priority may indicate that voice packets have the highest priority and that status update packets have the lowest priority. In some implementations, the CMC 426 may instruct the WLAN radio 424, the cellular radio 428, and/or the WPAN radio 430 to stop communication on the shared channels and/or on the non-shared channels if a packet of a higher priority is being transmitted within another wireless network.

In some implementations, the CMC 426 may control channel access based on channels that have acceptable channel conditions. In these and other implementations, the information extracted and/or derived from the preambles may describe channel state information (CSI). The CSI may indicate actual or estimated channel capacity usage by communications within the corresponding wireless networks. For example, the information extracted and/or derived from the preamble of the packet transmitted within the WPAN 429 may indicate that communication within the WPAN 429 is expected to consume sixty percent of a particular shared channel capacity and the information extracted and/or derived from the preamble of the packet transmitted within the WLAN 425 may indicate that communication within the WLAN 425 is expected to consume twenty five percent of the particular shared channel capacity. In this example, the CMC 426 may instruct the WLAN radio 424 and the WPAN radio 430 to share the particular shared channel. As another example, the information extracted and/or derived from the preamble of the packet transmitted within the WPAN 429 may indicate that communication within the WPAN 429 is expected to consume sixty percent of the particular shared channel capacity and the information extracted and/or derived from the preamble of the packet transmitted within the cellular network 427 may indicate that communication within the cellular network 427 is expected to consume forty five percent of the particular shared channel capacity. In this example, the CMC 426 may instruct the cellular radio 428 and the WPAN radio 430 to transmit on different channels since the aggregate expected channel capacity of communication within the WPAN 429 and the cellular network 427 exceeds a max channel capacity (e.g., one hundred percent in this example) of the particular shared channel.

Additionally or alternatively, the CMC 426 may control channel access based on expected traffic rates of the WLAN 425, the cellular network 427, and/or the WPAN 429. In some implementations, the information extracted and/or derived from the preambles may indicate whether the corresponding packets are first packets, middle packets, or last packets for the communication. In addition, in some implementations, the information extracted and/or derived from the preambles may indicate a number of packets that are to follow the current packet. In these and other implementations, the CMC 426 may control channel access to permit current traffic to be completed on the particular shared channel. For example, the information extracted and/or derived from the packet transmitted within the cellular network 427 may indicate that the current packet is a first of four packets. In this example, the CMC 426 may instruct the WLAN radio 424 and the WPAN radio 430 to not transmit on the particular shared channel until the remaining three packets are detected or otherwise received by the cellular radio 428. When the remaining three packets are detected or otherwise received by the cellular radio 428, the CMC 426 may permit the WLAN radio 424 and/or the WPAN radio 430 to transmit on the particular shared channel.

In addition, in some implementations, the information extracted and/or derived from the preambles may indicate whether the corresponding packets are initiating packets (e.g., initiating communication within the wireless networks), or response packets (e.g., responsive to packets received from an STA 106). For example, the information extracted and/or derived from the preamble of the packet transmitted within the WLAN 425 may indicate that the packet originated from the WLAN radio 424 (e.g., originated from a wireless access point). The CMC 426 may determine that, since the packet originated from the WLAN radio 424, the first STA 106*a* will transmit a response packet on the particular shared channel. The CMC 426 may instruct the cellular radio 428 and the WPAN radio 430 to not transmit on the particular shared channel until the response packet is detected or otherwise received by the WLAN radio 424.

Examples of channel access control being performed using information regarding antennas associated with the WLAN radio 424, the cellular radio 428, and/or the WPAN radio 430 will now be discussed. In some implementations, the WLAN radio 424, the cellular radio 428, and the WPAN radio 430 may be coupled to multiple antennas. In these and other implementations, the WLAN radio 424, the cellular radio 428, and the WPAN radio 430 may each be coupled to different antennas. For example, the WLAN radio 424 may be coupled to a first set of antennas, the WPAN radio 430 may be coupled to a second set of antennas, and the cellular radio 428 may be coupled to a third set of antennas. Alternatively, in some implementations, the WLAN radio 424, the cellular radio 428, and the WPAN radio 430 may share at least a portion of the antennas.

In some implementations, the CMC 426 may detect an antenna configuration of the first set of antennas and/or nulls within frequency bands created by the first set of antennas. In these and other implementations, the first set of parameters may include the antenna configuration of the first set of antennas and/or the nulls within the frequency bands created by the first set of antennas. Additionally or alternatively, the CMC 426 may perform the same or similar processes regarding the second set of antennas and/or the third set of antennas. In some implementations, the second set of parameters may include the antenna configuration of the second set of antennas and/or the nulls within the frequency bands created by the second set of antennas. Additionally, the third set of parameters may include the antenna configuration of the third set of antennas and/or the nulls within the frequency bands created by the third set of antennas.

In some implementations, the CMC 426 may determine which shared channels include extra bandwidth based on the antenna configuration of the first set of antennas, the second set of antennas, and/or the third set of antennas. For example, a range of channels where interference is allowable may depend on the beamforming patterns and antenna isolation, which may be used to determine a part of the bandwidth that may be available for use by other radios. In addition, the CMC 426 may instruct the WLAN radio 424, the cellular radio 428, and/or the WPAN radio 430 to transmit on a particular shared channel that includes extra bandwidth based on the antenna configurations.

In some implementations, the WLAN radio 424, the cellular radio 428, and/or the WPAN radio 430 may be configured to use channels in different sized segments. For example, the WLAN radio 424 may use channels in twenty megahertz (MHz) to one hundred sixty MHz sized segments and the WPAN radio 430 may use the channels in one MHz sized segments. In some implementations, the CMC 426 may determine if the first set of antennas are creating any nulls within portions of the segments the WLAN radio 424 is currently using. In these and other implementations, if the first set of antennas are creating nulls in portions of the segments, the CMC 426 may determine which frequencies the portions of the segments that nulls are being created in correspond to. In addition, the CMC 426 may instruct the WPAN radio 430 and/or the cellular radio 428 to transmit on the frequencies that correspond to the portions of the segments that nulls are being created in by the WLAN radio 424.

In some implementations, any of the radios 424, 428, 430 may coordinate, e.g., through the CMC 425, to selectively null at locations of STAs in other networks during simultaneous transmissions from co-located radios to thereby avoid interference at the wireless stations 106. In this and other examples, a given one of the radios, such as the WPAN radio 430, may be transmitting to, e.g., the third wireless station 106c in the WPAN 429. The WPAN radio 430 may report to or the CMC 426 may otherwise determine or be aware of the ongoing transmission in the WPAN 429. The existence of the ongoing transmission and a location of the third wireless station 106C may be included in the set of parameters of the WPAN 429. In this and other examples, the WLAN radio 424 may simultaneously transmit on an overlapping channel with the WPAN radio 430 to, e.g., the first wireless station 106a. However, the WLAN radio 424 may generate nulling at the location of the third wireless station 106c such that the transmission of the WLAN radio 424 on the overlapping channel does not interfere with the ongoing transmission from the WPAN radio 430 to the third wireless station 106c. In this example, the first wireless station 106a may be sufficiently far from the WPAN radio 430 and/or the power of the WPAN radio 430 may be sufficiently low that the ongoing transmission from the WPAN radio 430 to the third wireless station does not interfere with the transmission from the WLAN radio 424 to the first wireless station.

An example of channel access control being performed by scanning off channels of the WLAN 425, the cellular network 427, and/or the WPAN 429 will now be discussed. In some implementations, the CMC 426 may direct scanning of the off channels of the WLAN 425, the cellular network 427, and/or the WPAN 429 to be performed. In these and other implementations, the off channels may include channels that signals are not currently being transmitted on. The CMC 426 may determine an estimated interference (e.g., a potential interference) of the off channels based on the scan. In some implementations, the CMC 426 may generate an aggregated interference map that represents the estimated interference of the off channels. Based on the interference map, the CMC 426 may determine which off channels include more estimated interference and which off channels include less estimated interference. In these and other implementations, the CMC 426 may instruct the WLAN radio 424, the cellular radio 428, and/or the WPAN radio 430 to start transmitting on the off channels that include the least estimated interference. For example, the CMC 426 may instruct the cellular radio 428 to transmit on a smart channel of the off channels that includes lower interference than at least one other channel of the off channels based on the aggregated interference map. As another example, the CMC 426 may instruct the cellular radio 428 to transmit on the channel that includes the lowest estimated interference based on the aggregated interference map.

Examples of channel access control being performed based on request signals transmitted by the WLAN radio 424, the cellular radio 428, and/or the WPAN radio 430 will now be discussed. In some implementations, prior to transmitting, the WLAN radio 424, the cellular radio 428, and/or the WPAN radio 430 may provide request signals to the CMC 426. In these and other implementations, the request signals may include information describing planned traffic and trigger status. The information describing the planned traffic may indicate how many packets are to be transmitted. The trigger status may indicate whether the corresponding packets are trigger packets or not. In some implementations, the first set of parameters may include the information describing the planned traffic and/or the trigger status in the request signal provided by the WLAN radio 424. In these and other implementations, the second set of parameters may include the information describing the planned traffic and/or the trigger status in the request signal provided by the WPAN radio 430. Additionally, in some implementations, the third set of parameters may include the information describing the planned traffic and/or the trigger status in the request signal provided by the cellular radio 428.

In some implementations, the CMC 426 may determine the planned traffic for the WLAN 425, the cellular network 427, and/or the WPAN 429 based on the information describing the planned traffic. In these and other implementations, the CMC 426 may instruct the WLAN radio 424, the cellular radio 428, and/or the WPAN radio 430 to communicate with the corresponding STAs 106 on particular channels based on the planned traffic. For example, the CMC 426 may reserve a first subset of channels for the planned traffic within the WLAN 425, a second subset of channels for the planned traffic within the WPAN 429, and/or a third subset of channels for the planned traffic within the cellular network 427.

In some implementations, the CMC 426 may determine estimated traffic for the WLAN 425, the cellular network 427, and/or the WPAN 429 based on the request signals. In these and other implementations, the CMC 426 may track the number of request signals provided by the WLAN radio 424, the cellular radio 428, and the WPAN radio 430 during a period of time. For example, the cellular radio 428 may provide thirty request signals, the WLAN radio 424 may provide seventy request signals, and the WPAN radio 430 may provide twenty request signals during a one-hour period. In this example, the CMC 426 may determine the estimated traffic for an upcoming hour to be the same as the number of request signals sent during the one-hour period (e.g., the cellular radio 428 will provide thirty request signals, the WLAN radio 424 will provide seventy request signals, and the WPAN radio 430 will provide twenty request signals). During the upcoming hour, the CMC 426 may reserve particular channels for communication within the WLAN 425, the cellular network 427, and/or the WPAN 429 based on the estimated traffic for the WLAN 425, the cellular network 427, and/or the WPAN 429.

In some implementations, the CMC 426 may track the number of packets that were to be transmitted as indicated in the request signals provided by the WLAN radio 424, the cellular radio 428, and/or the WPAN radio 430 during the period of time. For example, the request signals from the cellular radio 428 may indicate that two hundred packets were to be transmitted within the cellular network 427, the WLAN radio 424 may indicate that one hundred fifty packets were to be transmitted within the WLAN 425, and the WPAN radio 430 may indicate that four hundred packets were to be transmitted within the WPAN 429 during a two-hour period. In this example, the CMC 426 may determine the estimated traffic for an upcoming two-hours for the WLAN 425, the cellular network 427, and the WPAN 429 to be the same as the number of packets that were to be transmitted during the two-hour period (e.g., two hundred packets will be transmitted within the cellular network 427, one hundred fifty packets will be transmitted within the WLAN 425, and four hundred packets will be transmitted within the WPAN 429). During the upcoming two-hours, the CMC 426 may reserve particular channels for communication within the WLAN 425, the cellular network 427, and/or the WPAN 429 based on the estimated number of packets.

In some implementations, the request signals may indicate whether the corresponding packets are initiating packets (e.g., initiating communication within the WLAN 425, the cellular network 427, or the WPAN 429), or response packets (e.g., responsive to packets from the STAs 106) based on the trigger status. For example, the trigger status within the request signal from the WLAN radio 424 may indicate that the corresponding packet that is to be transmitted by the WLAN radio 424 is an initiating packet. The CMC 426 may determine that since the corresponding packet that is to be transmitted by the WLAN radio 424 is an initiating packet, the first STA 106*a* will transmit at least one packet on the particular shared channel in response to the packet that is to be transmitted by the WLAN radio 424 (e.g., at least one response packet). The CMC 426 may instruct the cellular radio 428 and the WPAN radio 430 to not transmit on the particular shared channel until the response packet is detected or otherwise received by the WLAN radio 424. As another example, the trigger status within the request signal from the WPAN radio 430 may indicate that the corresponding packet is a response packet. The CMC 426 may determine that since the corresponding packet is a response packet, no additional packets from the third STA 106*c* are expected. The CMC 426 may not prevent the cellular radio 428 and/or the WLAN radio 424 from transmitting on the particular shared channel once the corresponding packet is transmitted by the WPAN radio 430.

In some implementations, the request signals may include information describing a power level, an airtime, and/or the frequency of the corresponding signals. In some implementations, the first set of parameters may include the power level, the airtime, and/or the frequency of the corresponding signals indicated in the request signals provided by the WLAN radio 424. In these and other implementations, the second set of parameters may include the power level, the airtime, and/or the frequency of the corresponding signals indicated in the request signals provided by the WPAN radio 430. Additionally or alternatively, the third set of parameters may include the power level, the airtime, and/or the frequency of the corresponding signals indicated in the request signals provided by the cellular radio 428.

In some implementations, the CMC 426 may determine a communication schedule based on the information describing the power level, the airtime, and/or the frequency of the corresponding signals in the request signals provided by the WLAN radio 424, the cellular radio 428, and/or the WPAN radio 430. In this and other implementations, power level may determine the amount of interference, airtime may determine the length of time that is unavailable, and frequency (channel and bandwidth) may determine what part of the channel is unavailable. In addition, the communication schedule may be determined based on the information describing the planned traffic and the trigger status. The CMC 426 may provide the communication schedule to the WLAN radio 424, the cellular radio 428, and the WPAN radio 430. The communication schedule may indicate when the WLAN radio 424, the cellular radio 428, and the WPAN radio 430 are to transmit. For example, the CMC may receive a first request signal from the WLAN radio 424 and a second request signal from the cellular radio 428. In this example, the CMC 426 may determine and provide the communication schedule to the WLAN radio 424 and the cellular radio 428. In addition, the communication schedule may indicate when the first request signal is granted and when the second request signal is granted.

In some implementations, the communication schedule may be determined to increase throughput of the communication within the WLAN 425, the cellular network 427, and/or the WPAN 429. In other implementations, the communication schedule may be determined to balance traffic load equally between the WLAN 425, the cellular network 427, and/or the WPAN 429. Alternatively, the communication schedule may be determined to provide priority to the WLAN 425, the cellular network 427, or the WPAN 429.

In some implementations, the airtime may indicate how much time elapses for communication between the WLAN radio 424 and the first STA 106a, between the cellular radio 428 and the second STA 106b, and/or between the WPAN radio 430 and the third STA 106c. in these and other implementations, the communication schedule may be determined to increase throughput of the WLAN 425, the cellular network 427, and/or the WPAN 429 by scheduling communication that has less airtime before communication that has more airtime. Additionally or alternatively, the communication schedule may be determined to balance the traffic load equally by scheduling the communication such that an average airtime for all communication is similar or the same for each of the WLAN 425, the cellular network 427, and the WPAN 429. In some implementations, an airtime priority may indicate a priority of packets based on the corresponding airtime. In these and other implementations, the communication schedule may be determined to give priority to packets that include a corresponding airtime that is within an airtime range.

Examples of channel access control being performed based on a statistical probability (e.g., likelihood) of communication within the WLAN 425, the cellular network 427, and/or the WPAN 429 will now be discussed. In some implementations, the CMC 426 may determine a statistical probability (e.g., a likelihood) of communication within the WLAN 425, the cellular network 427, and/or the WPAN 429 based on historical information. In these and other implementations, the historical information may be determined based on the request signals. In some implementations, the first set of parameters may include the statistical probability of communication within the WLAN 425. In these and other implementations, the second set of parameters may include the statistical probability of communication within the WPAN 429. Additionally or alternatively, the third set of parameters may include the statistical probability of communication within the cellular network 427.

In some implementations, the statistical probability of communication within the WLAN 425, the cellular network 427, and/or the WPAN 429 may be determined based on historical communication information. In some implementations, the CMC 426 may monitor the communication within the WLAN 425, the cellular network 427, and/or the WPAN 429 for a period of time. In these and other implementations, the CMC 426 may determine the historical communication information based on the monitoring of the WLAN 425, the cellular network 427, and/or the WPAN 429 for the period of time. In other implementations, the CMC 426 may determine the historical communication information based on the request signals provided by the WLAN radio 424, the cellular radio 428, and the WPAN radio 430.

The historical information may be used by the CMC 426 to determine the statistical probability of communication within the WLAN 425, the cellular network 427, and/or the WPAN 429. In some implementations, the CMC 426 may determine the communication schedule based on the statistical probability of communication within the WLAN 425, the cellular network 427, and/or the WPAN 429. In other implementations, the CMC 426 may determine the communication schedule based on an inverse of the statistical probability of communication within the WLAN 425, the cellular network 427, and/or the WPAN 429.

In some implementations, the WLAN radio 424 may provide information describing packets that are communicated within the WLAN 425 to the CMC 426. In these and other implementations, the cellular radio 428 may provide information describing packets that are communicated within the cellular network 427 to the CMC 426. Additionally or alternatively, the WPAN radio 430 may provide information describing packets that are communicated within the WPAN 429 to the CMC 426. In some implementations, the first set of parameters may include the information describing the packets that are communicated within the WLAN 425. In these and other implementations, the second set of parameters may include the information describing the packets that are communicated within the WPAN 429. Additionally or alternatively, the third set of parameters may include the information describing the packets that are communicated within the cellular network 427.

In some implementations, the CMC 426 may provide the information describing the packets to different radios. For example, the CMC 426 may provide the information describing the packets that are communicated within the WLAN 425 to the cellular radio 428 and/or the WPAN radio 430. As another example, the CMC 426 may provide the information describing the packets that are communicated within the WPAN 429 to the WLAN radio 424 and/or the cellular radio 428. As yet another example, the CMC 426 may provide the information describing the packets that are communicated within the cellular network 427 to the WLAN radio 424 and/or the WPAN radio 430.

The CMC 426 providing the information describing the packets to the different radios may permit the WLAN radio 424, the cellular radio 428, and/or the WPAN radio 430 to detect activity of the other wireless networks without having to be able to decipher packets according to the different protocols. In addition, the CMC 426 providing the information describing the packets to the different radios may permit the WLAN radio 424, the cellular radio 428, and/or the WPAN radio 430 to detect activity of the other wireless networks based on actual packet detection rather than energy detection. In some implementations, two or more of the above discussed examples of channel access control may be combined. For example, the communication schedule may be determined as discussed above and in view of the CSI indicated in the preambles of the packets.

In some implementations, the CMC 426 may determine a set of parameters of each of one or more of the networks in FIG. 4, e.g., the WLAN 425, the cellular network 427, or the WPAN 429. In addition, the CMC 426 may determine-based on the set of parameters, one or more operating parameters of a different one of the networks than the network(s) for which the set of parameters is determined. Further, the CMC 426 may operate a radio of the different one of the networks according to the operating parameters.

As an example, the CMC 426 may determine channel quality and available information of the WLAN 425 and the cellular network 427 and may determine, based on the foregoing parameters, one or more operating parameters of the WPAN 429. The one or more operating parameters may include at least one of: a transmission power, a beamforming matrix, channel assignments of the WPAN radio 430 of the WPAN 429, aggregation level, duty cycle, or MCS. The CMC 426 may then operate the WPAN radio using the determined transmission power, beamforming matrix, or the channel assignments. The channel quality and availability information may include at least one of clear channel assessment (CCA) or interference levels of one or more sensed channels.

As another example, the CMC 426 may determine a duration and timing of a TXOP reserved by the WLAN radio 424 in the WLAN 425 and may determine, based on the duration and timing of the TXOP, a transmission schedule of the WPAN radio 430 in the WPAN 429 during the TXOP. The CMC 426 may then operate the WPAN radio 430 in the WPAN 429 to transmit data in the WPAN 429 according to the transmission schedule during the TXOP of the WLAN 425. In some implementations, the WPAN radio 430 may transmit data in the WPAN 429 according to the transmission schedule during the TXOP of the WLAN 425 without performing channel access before transmitting the data.

As another example, the CMC 426 may determine an expected start time of a next empty transmission slot in the WLAN 425 and may determine, based on the expected start time, a transmission schedule in the WPAN 429 that begins at the expected start time of the next empty transmission slot in the WLAN 425. The CMC 426 may then operate the WPAN radio 430 in the WPAN 430 according to the transmission schedule beginning at the expected start time of the next empty transmission slot in the WLAN 425. The CMC 426 may also determine the expected start time of the next empty transmission slot as a sum of an expected end time of a current occupied transmission slot in the WLAN 425 and at least one of: a distributed coordination function (DCF) interframe space (DIFS), an extended interframe space (EIFS), or a reduced interframe space (RIFS).

As another example, the CMC 426 may determine an indication of an ongoing transmission in the WPAN 429 or the cellular network 427 and may determine, based on the indication, to set an ongoing transmission interference flag as an operating parameter of the WLAN 425. The CMC 426 may then operate the WLAN radio 424 in the WLAN 425 to receive a request to send (RTS) message from another radio in the WLAN 425 (e.g., from a WLAN radio of the first wireless station 106a) during ongoing transmission in the WPAN 429 or the cellular network 427 and to withhold transmission of a clear to send (CTS) message in the WLAN 425 in response to the RTS message for a duration of the ongoing transmission in the WPAN 429 or the cellular network 427. In some implementations, the CMC 426 may instruct all devices within the WLAN 425 to turn on the RTS/CTS protocol in response to, e.g., an expectation of traffic in the WPAN 429 or the cellular network 427 or other criteria.

As another example, the CMC 426 may determine an indication of absence of detected motion in a location of the WPAN 430, the WPAN 430 having less reach than the WLAN 425 and may determine, based on the indication, to set a motion sensing inquiry flag as an operating parameter of the WLAN 425. The CMC 426 may then operate the WLAN radio 424 to send a message to a remote wireless communication device through a remote WLAN radio of the remote wireless communication device to turn on a remote WPAN radio (or other short-reach radio) of the remote wireless communication device for motion detection in a location of a remote WPAN that includes the remote WPAN radio where the remote WPAN has less reach than the WLAN 425 and may be located within or overlapping the WLAN 425.

As another example, the CMC 426 may determine that the WLAN radio 424 has received a request from a remote WLAN radio of a remote wireless communication device to turn on the WPAN radio 430 for motion detection in the WPAN 429 where the WPAN 429 has less reach than the WLAN 425. Based on the foregoing, the CMC 426 may determine to set a motion sensing flag as an operating parameter for the WPAN radio 430. The CMC 426 may then operate the WPAN radio 430 to detect motion in the WPAN 429.

As another example, the CMC 426 may determine an indication of an ongoing transmission in the WPAN 429 from the WPAN radio 430 to the third wireless station 106c and a location of the third wireless station 106c as parameters of the WPAN 429. Based on the foregoing, the CMC 426 may determine a beamforming matrix for the WLAN radio 424, or may provide the foregoing to the WLAN radio 424 to determine the beamforming matrix. The beamforming matrix may be configured to transmit a signal to the first wireless station 106a in the WLAN 425 and to null the signal at the location of the third wireless station 106c. The CMC 426 may then operate the WLAN radio 424 in the WLAN 425 to apply the beamforming matrix to transmit the signal to the first wireless station 106a and null the signal at the location of the third wireless station 106c.

As another example, the CMC 426 may determine traffic priority information that indicates first traffic to be sent in the WPAN 429 to or from the WPAN radio 430 has a first priority that is relatively high as parameters of the WPAN 429. In this example, the WPAN radio 430 may include a Bluetooth radio. Based on the foregoing, the CMC 426 may determine the WLAN radio 424 is to operate in a power save operating mode to avoid interference on the overlapping channels with the first traffic in the WPAN 429. In this example, the WLAN radio 424 may include a WiFi radio. The CMC 426 may then operate the WLAN radio 424 in the power save operating mode. In some implementations, the WLAN radio 424 may notify the first wireless station 106a or other client devices in the WLAN 425 that the WLAN radio 424 is operating in the power save operating mode so the client devices do not send traffic over the WLAN 425 while the WLAN radio 424 is in the power save operating mode. For example, the WLAN radio 424 may set a power save bit to notify the client devices in the WLAN 425 that the WLAN radio 424 is in the power save operating mode. In an example, the wireless communication device 108 may receive a side channel notification through a third radio of a third wireless network that indicates that a client device in the WLAN 425 has second traffic to send to the WLAN radio 424 with a second priority that is higher than the first priority of the first traffic. The third radio and third wireless network may include a zigbee radio and zigbee wireless network (not shown in FIG. 4). In response to the side channel notification, the CMC 426 may change operation of the WLAN radio 424 from the power save operating mode to a normal operating mode to receive the second traffic from the client device in the WLAN 425.

FIG. 4 illustrates the environment 400 with a single WLAN 425, cellular network 427, and WPAN 429. In another implementation, the environment 400 may include two or more WLANs 425, cellular networks 427, and WPANs 429. In addition, the WLAN 425, the cellular network 427, and the WPAN 429 are each illustrated as including a single STA 106. In another implementation, the WLAN 425, the cellular network 427, and the WPAN 429 may each include a different number of STAs 106. More generally, each of the WLAN 425, the cellular network 427, and the WPAN 429 may include one or more STAs 106.

Figure 5A:
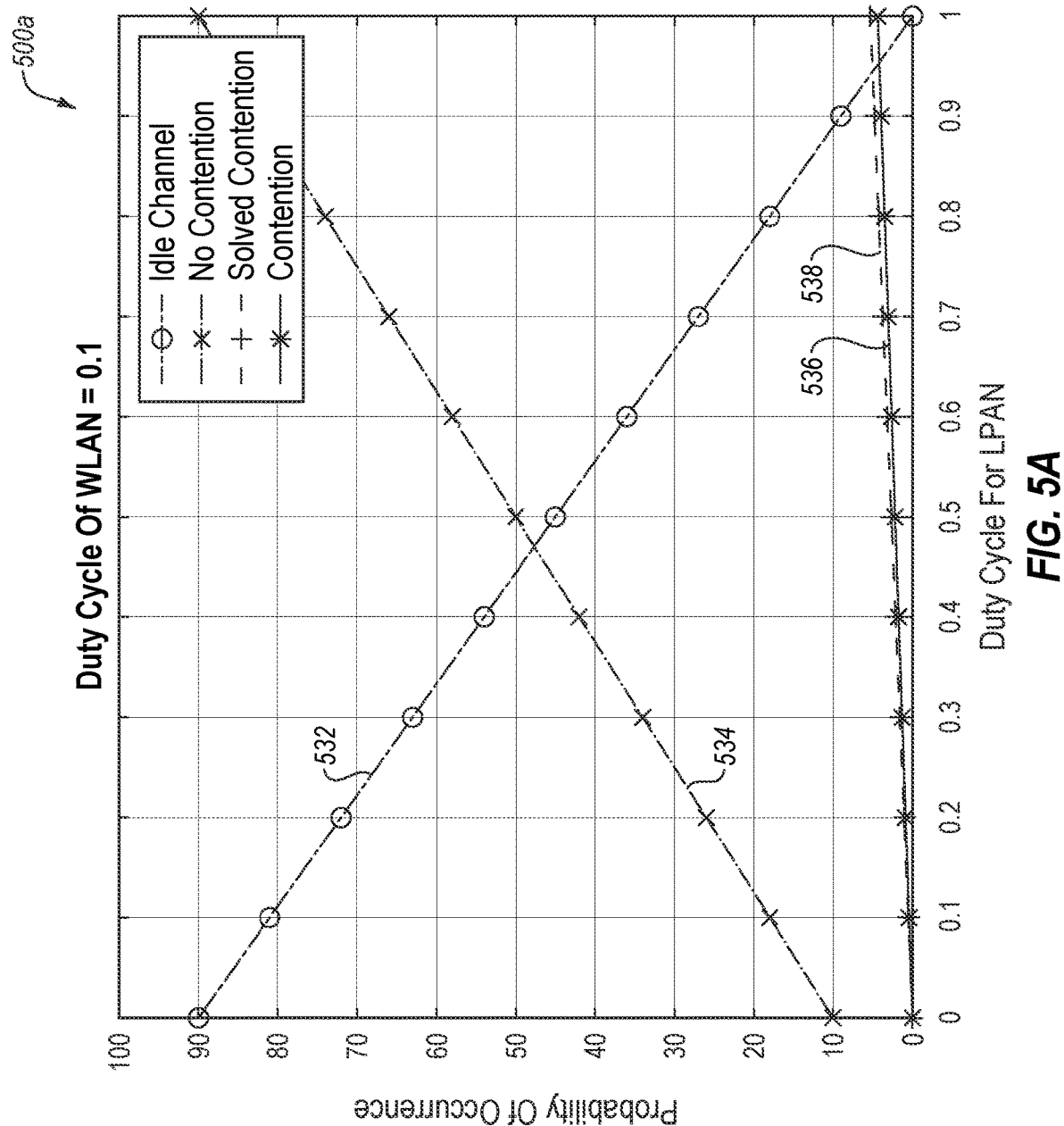
FIG. 5A illustrates a graphical representation of statistical probabilities of contention and no contention scenarios occurring based on a first constant duty cycle of a wireless local area network (WLAN) radio and a duty cycle of a wireless personal area network (WPAN) radio.

FIG. 5A illustrates a graphical representation 500a of statistical probabilities of contention and no contention scenarios occurring based on a first constant duty cycle of the WLAN radio 424 and a duty cycle of the WPAN radio 430. The probability of occurrence of the contention and no contention scenarios are determined as functions of the duty cycle of the WPAN radio 430. The graphical representation 500a was obtained using a Bluetooth radio for the WPAN radio 430. In addition, the graphical representation 500a was obtained using traffic parameters for the WLAN radio 424 of sixty percent on-time for the downlink and forty percent on-time for the uplink. Further, the graphical representation 500a was obtained using traffic parameters for the WPAN radio 430 of fifty percent on-time for the downlink and fifty percent on-time for the uplink. The first constant duty cycle of the WLAN radio 424 was set at 0.1 (e.g., ten percent, which corresponds to low traffic for the WLAN radio 424) and the duty cycle of the WPAN radio 430 ranged between 0 and 1 (e.g., ranged between zero percent and one hundred percent).

Curve 532 represents the probability of occurrence of idle channel scenarios as a function of the duty cycle of the WPAN radio 430. Curve 534 represents the probability of occurrence of no contention scenarios as a function of the duty cycle of the WPAN radio 430. In addition, curve 536 represents the probability of occurrence of contention scenarios as a function of the duty cycle of the WPAN radio 430. Further, curve 538 represents the probability of occurrence of solved contention scenarios as a function of the duty cycle of the WPAN radio 430. Solved contention scenarios may include contention scenarios in which channel access control was implemented to prevent interference or packet loss.

As illustrated in FIG. 5A, when the duty cycle of the WLAN radio 424 is low and the duty cycle of the WPAN radio 430 increases, a proportion of idle time scenarios decreases (e.g., curve 532 goes down) and a proportion of no contention scenarios increase (e.g., curve 534 goes up).

Figure 5B:
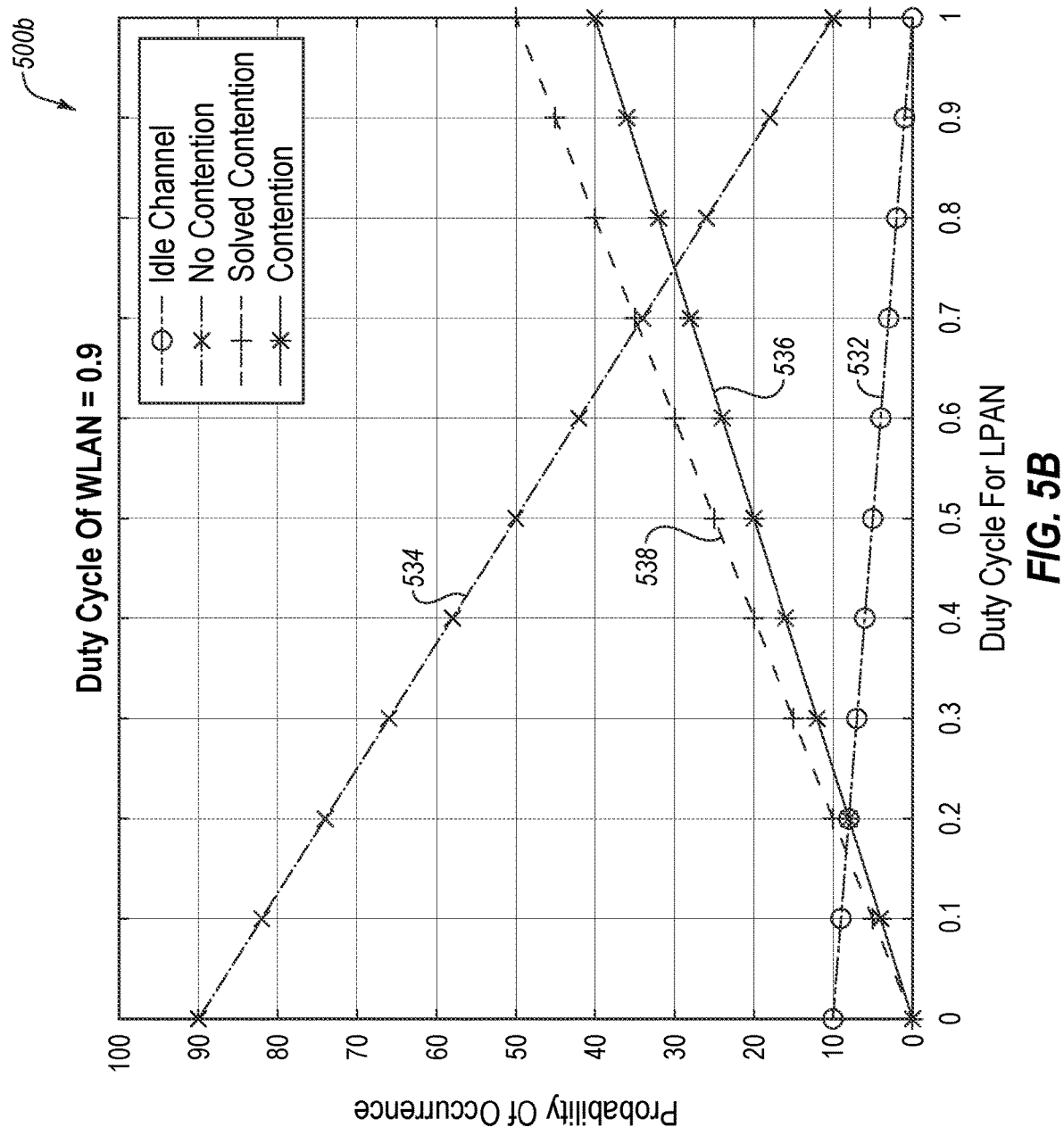
FIG. 5B illustrates a graphical representation of statistical probabilities of contention and no contention scenarios occurring based on a second constant duty cycle of the WLAN radio and the duty cycle of the WPAN radio.

FIG. 5B illustrates a graphical representation 500b of statistical probabilities of contention and no contention scenarios occurring based on a second constant duty cycle of the WLAN radio 424 and the duty cycle of the WPAN radio 430. The graphical representation 500b was also obtained using the Bluetooth radio for the WPAN radio 430. In addition, the graphical representation 500b was obtained using the same traffic parameters discussed above in relation to FIG. 5A. The second constant duty cycle of the WLAN radio 424 was set at 0.9 (e.g., ninety percent, which corresponds to high traffic for the WLAN radio 424) and the duty cycle of the WPAN radio 430 ranged between 0 and 1 (e.g., ranged between zero percent and one hundred percent).

As illustrated in FIG. 5B, when the duty cycle of the WLAN radio 424 is high and the duty cycle of the WPAN radio 430 increases, the proportion of no contention scenarios goes down (e.g., curve 534 goes down) and a proportion of contention scenarios goes up (e.g., curve 536 goes up).

Figure 6:
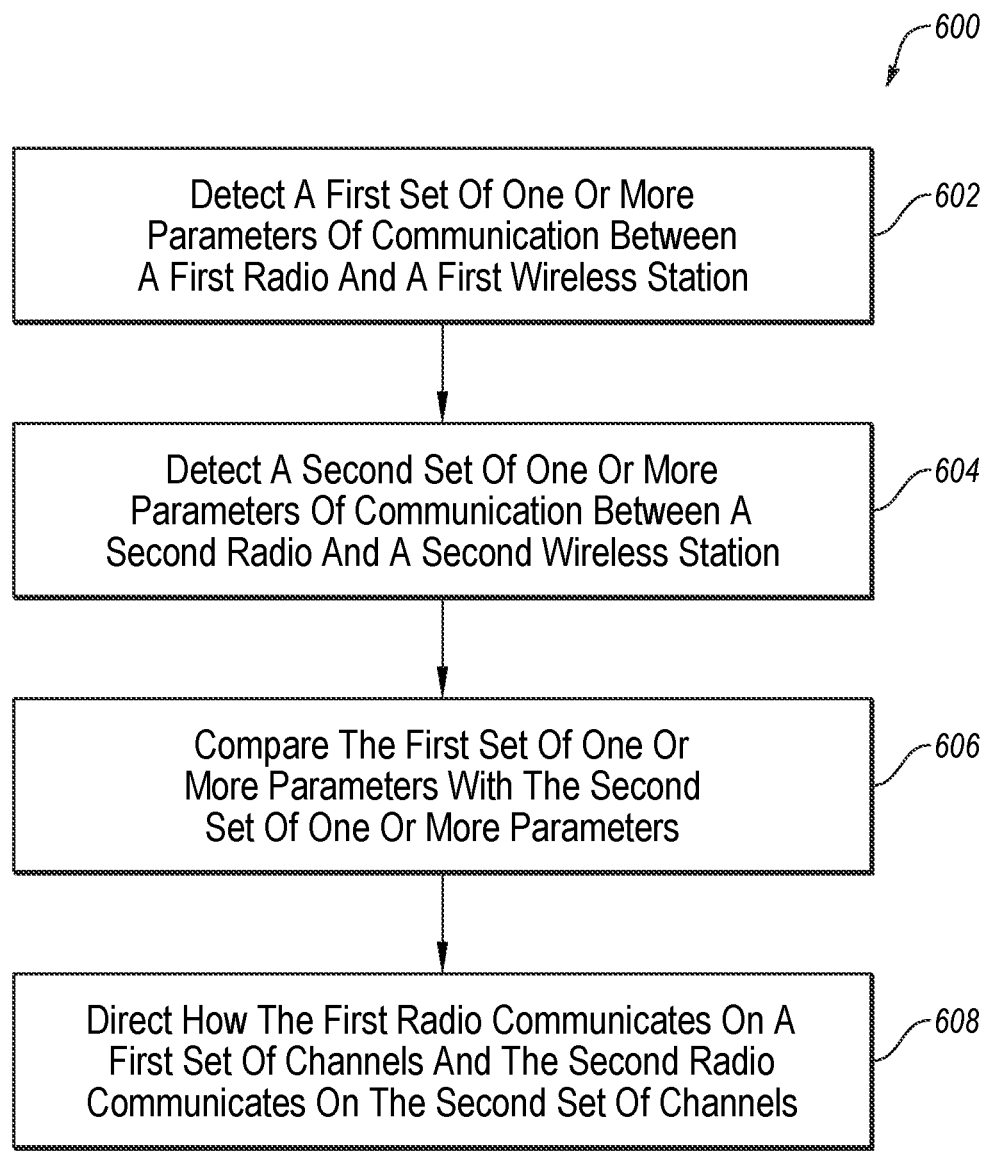
FIG. 6 illustrates a flowchart of an example method of performing channel access of multiple radios.

FIG. 6 illustrates a flowchart of an example method 600 to perform channel access across multiple radios. In some implementations, the method 600 may be performed for channel access across multiple radios in WLANs, cellular networks, and/or WPANs, such as across the WLAN 425, the cellular network 427, and/or the WPAN 429 of FIG. 4. The method 600 may be performed by any suitable system, apparatus, or device. For example, the wireless communication device 108 of FIG. 1, the CMC 426 of FIG. 4, and/or the PTA circuit 210 of FIG. 2 may perform or direct performance of one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may include a block 602, at which a first set of one or more parameters of communication between a first radio and a first STA may be detected. In some implementations, the first set of one or more parameters may be detected on a set of one or more overlapping channels. In these and other implementations, the first radio may be configured to communicate with the first STA according to a first communication protocol. In addition, in some implementations, the first radio may be configured to communicate on a first set of channels that includes the set of one or more overlapping channels. Block 602 may be followed by block 604.

At block 604, a second set of one or more parameters of communication between a second radio and a second STA may be detected. In some implementations, the second set of one or more parameters may be detected on the set of one or more overlapping channels. In these and other implementations, the second radio may be configured to communicate with the second STA according to a second communication protocol that is different than the first communication protocol. In addition, in some implementations, the second radio may be configured to communicate on a second set of channels that includes the set of one or more overlapping channels. Further, the second set of channels and the first set of channels may overlap each other on the set of one or more overlapping channels. Block 604 may be followed by block 606.

At block 606, the first of one or more parameters may be compared with the second set of one or more parameters. For example, the planned traffic for the first wireless network may be compared to the planned traffic for the second wireless network. As another example, a packet type on the first wireless network may be compared to a packet type on the second wireless network. Block 606 may be followed by block 608.

At block 608, how the first radio communicates on the first set of channels and how the second radio communicates on the second set of channels may be directed. For example, the CMC 426 may reserve particular shared channels for communication within the first wireless network. As another example, the CMC 426 may instruct the second radio to stop transmitting and instruct the first radio to start transmitting on particular shared channels.

Modifications, additions, or omissions may be made to the method 600 without departing from the scope of the present disclosure. For example, the operations of method 600 may be implemented in differing order. Additionally or alternatively, two or more operations of the method 600 may be performed at the same time. Furthermore, the outlined operations and actions of the method 600 are only provided as examples, and some of the operations and actions may be optional, combined into fewer operations and actions, or expanded into additional operations and actions without detracting from the essence of the described implementations. In addition, in some implementations, the method 600 may be performed iteratively in which one or more operations may be performed for multiple wireless networks.

Figure 7:
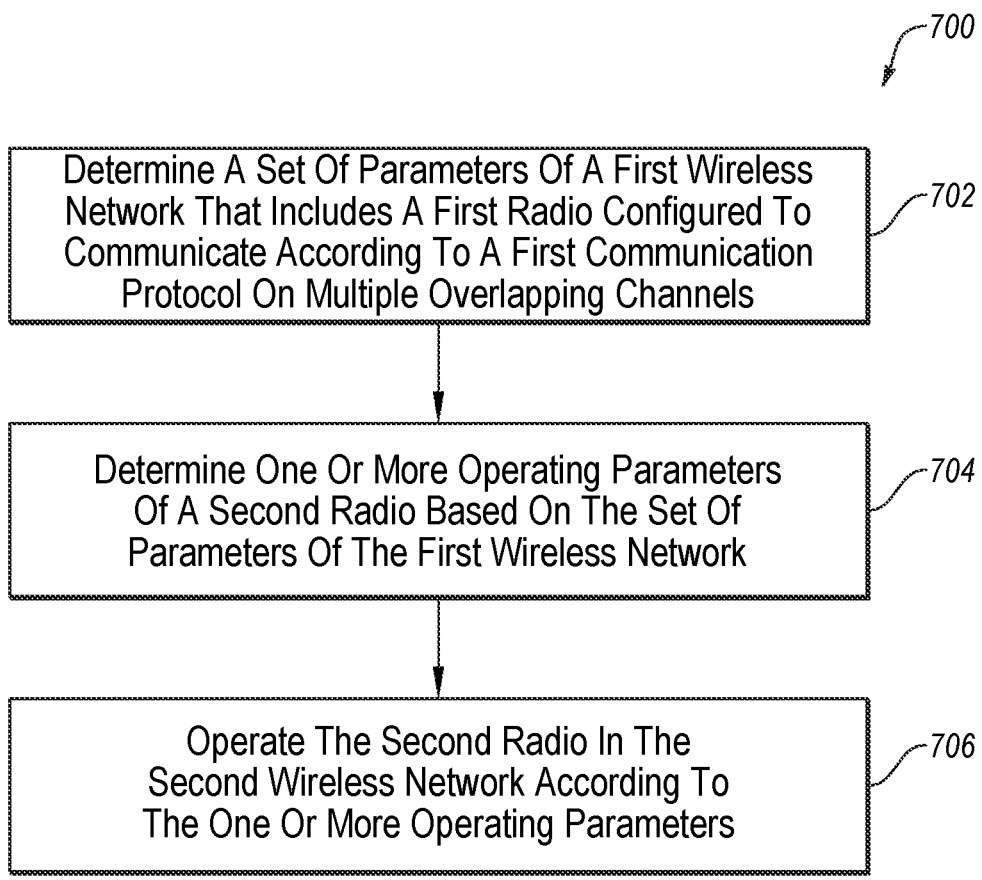
FIG. 7 illustrates a flowchart of an example method of coexistence management.

FIG. 7 illustrates a flowchart of an example method 700 of coexistence management. The method 700 may be performed across multiple radios in WLANs, cellular networks, and/or WPANs, such as across the WLAN 425, the cellular network 427, and/or the WPAN 429 of FIG. 4. The method 700 may be performed by any suitable system, apparatus, or device. For example, the wireless communication device 108 of FIG. 1, the CMC 426 of FIG. 4, and/or the PTA circuit 210 of FIG. 2 may perform or direct performance of one or more of the operations associated with the method 700. Although illustrated with discrete blocks, the steps and operations associated with one or more of the blocks of the method 600 may be divided into additional blocks, combined into fewer blocks, or eliminated, depending on the particular implementation. The method 700 may include one or more of blocks 702, 704, and/or 706.

At block 702, the method 700 may include determining a set of parameters of a first wireless network that includes a first radio configured to communicate according to a first communication protocol on multiple overlapping channels. Block 702 may be followed by block 704.

At block 704, the method 700 may include determining one or more operating parameters of a second radio based on the set of parameters of the first wireless network. The second radio may be included in a second wireless network, may be co-located with the first radio, and may be configured to communicate according to a second communication protocol on the overlapping channels. Block 704 may be followed by block 706.

At block 706, the method 700 may include operating the second radio in the second wireless network according to the one or more operating parameters.

In an example, the set of parameters of the first wireless network determined at block 702 may include channel quality and availability information of one or more channels sensed by the first radio. The one or more operating parameters of the second radio determined at block 704 based on the set of parameters of the first wireless network may include one or more of: a transmission power, a beamforming matrix, or channel assignments of the overlapping channels on which to transmit or not transmit. Operating the second radio in the second wireless network according to the one or more operating parameters at block 706 may include operating the second radio according to the one or more of: the transmission power, the beamforming matrix, or the channel assignments. The channel quality and availability information of the first wireless network may include at least one of clear channel assessment (CCA) or interference levels of the one or more sensed channels.

In another example, the set of parameters of the first wireless network determined at block 702 may include a duration and timing of a TXOP reserved by the first radio in the first network. The one or more operating parameters of the second radio determined at block 704 based on the set of parameters of the first wireless network may include a transmission schedule in the second wireless network during the TXOP. Operating the second radio in the second wireless network according to the one or more operating parameters at block 706 may include operating the second radio to transmit data in the second wireless network according to the transmission schedule during the TXOP of the first wireless network. Operating the second radio in the second wireless network according to the one or more operating parameters at block 706 may further include operating the second radio to transmit the data in the second wireless network according to the transmission schedule during the TXOP of the first wireless network without performing channel access before transmitting the data.

In another example, the set of parameters of the first wireless network determined at block 702 may include an expected start time of a next empty transmission slot in the first network. The one or more operating parameters of the second radio determined at block 704 based on the set of parameters of the first wireless network may include a transmission schedule in the second wireless network that begins at the expected start time of the next empty transmission slot in the first wireless network. Operating the second radio in the second wireless network according to the one or more operating parameters at block 706 may include operating the second radio to transmit data in the second wireless network according to the transmission schedule beginning at the expected start time of the next empty transmission slot in the first wireless network. The method 700 may further include determining the expected start time of the next empty transmission slot as a sum of an expected end time of a current occupied transmission slot and at least one of: a DIFS, an EIFS, or a RIFS.

In another example, the set of parameters of the first wireless network determined at block 702 may include an indication of an ongoing transmission in the first wireless network. The one or more operating parameters of the second radio determined at block 704 based on the set of parameters of the first wireless network may include an ongoing transmission interference flag. Operating the second radio in the second wireless network according to the one or more operating parameters at block 706 may include operating the second radio to receive an RTS message from another radio in the second wireless network during ongoing transmission in the first wireless network and to withhold transmission of a CTS message in the second wireless network in response to the RTS message for a duration of the ongoing transmission in the first wireless network.

In another example, the set of parameters of the first wireless network determined at block 702 may include an indication of absence of detected motion in a location of the first wireless network, the first wireless network having less reach than the second wireless network. The one or more operating parameters of the second radio determined at block 704 based on the set of parameters of the first wireless network may include a motion sensing inquiry flag. Operating the second radio in the second wireless network according to the one or more operating parameters at block 706 may include operating the second radio to send a message to a remote wireless communication device through a remote second radio of the remote wireless communication device to turn on a remote first radio of the remote wireless communication device for motion detection in a location of a remote network that includes the remote first radio, the remote network having less reach than the second wireless network.

In another example, the set of parameters of the first wireless network determined at block 702 may include a request from a remote first radio in the first wireless network to turn on the second radio for motion detection in the second wireless network, the second wireless network having less reach than the first wireless network. The one or more operating parameters of the second radio determined at block 704 based on the set of parameters of the first wireless network may include a motion sensing flag. Operating the second radio in the second wireless network according to the one or more operating parameters at block 706 may include operating the second radio to detect motion in the second wireless network.

In another example, the set of parameters of the first wireless network determined at block 702 may include an indication of an ongoing transmission in the first wireless network from the first radio to a first wireless station and a location of the first wireless station. The one or more operating parameters of the second radio determined at block 704 based on the set of parameters of the first wireless network may include a beamforming matrix to transmit a signal to a second wireless station in the second wireless network and to null the signal at the location of the first wireless station. Operating the second radio in the second wireless network according to the one or more operating parameters at block 706 may include operating the second radio to transmit the signal to the second wireless station and to null the signal at the location of the first wireless station.

In another example, the set of parameters of the first wireless network determined at block 702 may include traffic priority information that indicates first traffic to be sent in the first wireless network to or from the first radio has a first priority that is relatively high. The one or more operating parameters of the second radio determined at block 704 based on the set of parameters of the first wireless network may include a power save operating mode to avoid interference on the overlapping channels with the first traffic in the first wireless network. Operating the second radio in the second wireless network according to the one or more operating parameters at block 706 may include operating the second radio in the power save operating mode. In this or other examples, the method 700 may further include at least one of: notifying client devices in the second wireless network that the second radio is operating in the power save operating mode so the client devices do not send traffic over the second wireless network while the second radio is in the power save operating mode; receiving a side channel notification through a third radio of a third wireless network that indicates that a client device has second traffic to send to the second radio with a second priority that is higher than the first priority of the first traffic, the third radio configured to communicate according to a third communication protocol that is different than the first and second communication protocols; or changing operation of the second radio in the second wireless network from the power save operating mode to a normal operating mode to receive the second traffic from the client device.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a MIMO apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some examples presented herein.

Example 1. A method comprising:

determining a set of parameters of a first wireless network that includes a first radio configured to communicate according to a first communication protocol on a plurality of overlapping channels;

determining one or more operating parameters of a second radio based on the set of parameters of the first wireless network, the second radio included in a second wireless network, co-located with the first radio, and configured to communicate according to a second communication protocol on the plurality of overlapping channels; and operating the second radio in the second wireless network according to the one or more operating parameters.

Example 2. A wireless communication device, comprising:

a first radio configured to communicate in a first wireless network according to a first communication protocol on a plurality of overlapping channels;

a second radio co-located with the first radio and configured to communicate in a second wireless network according to a second communication protocol on the plurality of overlapping channels; and a coexistence management circuit coupled to the first radio and the second radio, the coexistence management circuit configured to:

determine a set of parameters of the first wireless network;

determine one or more operating parameters of the second radio based on the set of parameters of the first wireless network; and operate the second radio in the second wireless network according to the one or more operating parameters.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
determining traffic priority information of a first wireless network that includes a first radio configured to communicate according to a first communication protocol on a plurality of overlapping channels;
determining an operating mode of a second radio as a power save operating mode based on the traffic priority information of the first wireless network, the second radio included in a second wireless network and configured to communicate according to a second communication protocol on the plurality of overlapping channels, the power save operating mode configured to avoid interference on the plurality of overlapping channels with traffic in the first wireless network;
operating the second radio in the determined power save operating mode; and
receiving a notification through a third radio of a third wireless network that indicates that a client device included in the second wireless network has traffic to send to the second radio with a higher priority than the traffic in the first wireless network, the third radio configured to communicate according to a third communication protocol that is different than the first and second communication protocols.

2. The method of claim 1, further comprising, in response to the notification, changing operation of the second radio in the second wireless network from the power save operating mode to a normal operating mode to receive the traffic from the client device.

3. The method of claim 1, wherein at least one of:
the second radio is co-located with the first radio; or
the third radio is co-located with the second radio.

4. The method of claim 1, further comprising notifying one or more client devices in the second wireless network that the second radio is operating in the power save operating mode so the client devices do not send traffic over the second wireless network while the second radio is in the power save operating mode.

5. The method of claim 4, wherein notifying the one or more client devices in the second wireless network that the second radio is operating in the power save operating mode comprises the second radio setting a power save bit to notify the one or more client devices that the second radio is in the power save operating mode.

6. The method of claim 1, wherein:
determining traffic priority information of the first wireless network that includes the first radio configured to communicate according to the first communication protocol comprises determining traffic priority information of a wireless personal area network (WPAN) that includes a WPAN radio configured to communicate according to one of a Bluetooth protocol, a ZigBee protocol, or a Thread protocol; and
determining the operating mode of the second radio comprises determining the operating mode of a wireless local area network (WLAN) radio configured to communicate according to an IEEE 802.11 protocol.

7. A wireless communication device, comprising:
a first radio configured to communicate in a first wireless network according to a first communication protocol on a plurality of overlapping channels;
a second radio co-located with the first radio and configured to communicate in a second wireless network according to a second communication protocol on the plurality of overlapping channels;

a third radio configured to communicate in a third wireless network according to a third communication protocol that is different than the first and second communication protocols; and a coexistence management circuit coupled to the first radio and the second radio, the coexistence management circuit configured to:

determine traffic priority information of the first wireless network;

determine an operating mode of the second radio as a power save operating mode based on the traffic priority information of the first wireless network, the power save operating mode configured to avoid interference on the plurality of overlapping channels with traffic in the first wireless network;

operate the second radio in the determined power save operating mode; and receive a notification through the third radio that indicates that a client device included in the second wireless network has traffic to send to the second radio with a higher priority than the traffic in the first wireless network.

8. The wireless communication device of claim 7, wherein the coexistence management circuit is further configured, in response to the notification, to change operation of the second radio in the second wireless network from the power save operating mode to a normal operating mode to receive the traffic from the client device.

9. The wireless communication device of claim 7, wherein the coexistence management circuit is further configured to notify one or more client devices in the second wireless network that the second radio is operating in the power save operating mode so the client devices do not send traffic over the second wireless network while the second radio is in the power save operating mode.

10. The wireless communication device of claim 9, wherein the coexistence management circuit is configured to notify the one or more client devices in the second wireless network that the second radio is operating in the power save operating mode by the second radio setting a power save bit to notify the one or more client devices that the second radio is in the power save operating mode.

11. The wireless communication device of claim 7, wherein:

the first wireless network comprises a wireless personal area network (WPAN);

the first radio comprises a WPAN radio;

the first communication protocol comprises one of a Bluetooth protocol, a ZigBee protocol, or a Thread protocol;

the second wireless network comprises a wireless local area network (WLAN);

the second radio comprises a WLAN radio; and the second communication protocol comprises an IEEE 802.11 protocol.

* * * * *